United States Patent [19]

Fryer

[11] Patent Number: 5,490,741

[45] Date of Patent: Feb. 13, 1996

[54] METERED BLENDING EQUIPMENT FOR SOILS, SLUDGES AND LIQUID/SOLID MIXTURES

[75] Inventor: David T. Fryer, Wyomissing, Pa.

[73] Assignee: Red Rose Environmental, Inc., Sewickley, Pa.

[21] Appl. No.: 140,684

[22] Filed: Oct. 21, 1993

[51] Int. Cl.$^6$ .................................. B09B 3/00; E02D 3/12
[52] U.S. Cl. .................. 405/128; 366/177.1; 405/258; 405/263
[58] Field of Search ........................ 405/128, 129, 405/258, 263; 588/249; 241/DIG. 38; 366/177, 172

[56] References Cited

U.S. PATENT DOCUMENTS

| | | | |
|---|---|---|---|
| 4,498,783 | 2/1985 | Rudolph | 366/177 X |
| 4,712,919 | 12/1987 | Bouldin | 366/177 X |
| 4,913,586 | 4/1990 | Gabbita | 405/129 |
| 4,918,659 | 4/1990 | Bragg et al. | 366/177 X |
| 4,927,293 | 5/1990 | Campbell | 405/128 |
| 5,005,980 | 4/1991 | Zimmerman | 366/177 X |
| 5,013,185 | 5/1991 | Taki | 405/128 |
| 5,251,825 | 10/1993 | Dumaine et al. | 241/DIG. 38 |

*Primary Examiner*—Dennis L. Taylor
*Attorney, Agent, or Firm*—Reed Smith Shaw & McClay

[57] ABSTRACT

Apparatus for metered blending of contaminated soil or sludge materials with dry powder and liquid chemicals to stabilize the contaminated materials. A vibratory screen separates the material to a desired size for processing. The screened material enters a bin and is conveyed therein to a discharge end where an adjustable gate meters the materials into a mixing chamber. At the discharge end, dry and liquid chemicals are separately metered into the mixing chamber wherein the material and chemicals are thoroughly mixed and from which the blended materials are discharged. An attachment may be provided which allows flail chains to process wet clay soils by breaking the wet clay clods into sizes which can pass through the vibratory screen means.

10 Claims, 9 Drawing Sheets

METERED BLENDING EQUIPMENT FOR SOILS, SLUDGES AND LIQUID/SOLID MIXTURES

BACKGROUND OF THE INVENTION

1. The Field of the Invention

This invention relates in general to equipment used in the process of blending soils, sludges and liquid/solid mixtures with dry powdered and liquid chemicals. In particular, this invention relates to blending equipment used in the environmental field to stabilize contaminated soils, sludges and liquid/solid mixtures so the resulting product will be rendered harmless to the environment.

2. The Prior Art

Due to the nature of the environmental soil remediation business, equipment used in the field have been adaptations of construction or excavation equipment. An early form of blending stabilizing chemicals into soil involved spreading the chemicals over the soil and turning it in with a back hoe. Other attempts have involved turning a large auger vertically into the soil while injecting chemicals at or through it. U.S. Pat. No. 5,013,185 dated May 7, 1991 involved using multi-shafted augers to inject and blend stabilization chemicals into soils. These in situ methods however do not ensure accurate or thorough mixing of the materials or allow for testing of composition during or after the operation.

Other equipment used involves adaptation of concrete mixing equipment, either rotary barrel or volumetric mixers. Neither type will adequately process either clay-like or sludge consistencies and ensure proper mixing. U.S. Pat. No. 4,913,586 dated Apr. 3, 1990 describes a process for blending soil but makes no provisions for a liquid additive necessary for complete chemical stabilization of soils. It is also limited in previously excavated situations and where tank removals occur.

From the foregoing, it will be appreciated that what is needed in the art is equipment capable of accurately metering soils or sludges of any consistency from dry to nearly liquid. It would be a further advancement in the art for the equipment to blend all materials accurately and completely on a continual production basis allowing high volume throughout.

SUMMARY OF TEE INVENTION

The present invention has drawn from not only the construction and excavation industries, but has combined the innovativeness of the agricultural and mining fields to solve a difficult materials handling problem.

In its broadest aspects, the present invention provides apparatus for mixing soils, sludges and liquid/solid mixtures of various consistencies with dry chemicals and wet chemicals. The apparatus comprises in combination: means for processing the materials for introduction into the apparatus; means for individually monitoring and metering said soils, sludges and liquid/solid mixtures and said dry chemicals and wet chemicals to maintain control of chemical proportions; and means for physically mixing the materials introduced into said apparatus such that chemical stabilization is achieved.

The design of the present invention comprises one or more straight-sided or very steep-angled bins into which the soil or sludge materials are fed. The material bin(s) has a flat floor with drag chains comprising driven chains on either side of the bin, joined by bars moving in parallel to one another for the purpose of conveying material to the discharge end of the bin. The bin can be covered with a vibratory screen to separate the materials to a desired size for processing. The discharge end of the bin has an adjustable gate for metering materials by varying the height of the opening. One or more metering devices are provided at the discharge end of the bin for introducing dry powder chemicals to the mixing chamber. Also located in that area are the valves and piping for introducing any liquid chemicals into the mixing chamber along with gauges to maintain proper desired quantities. A mixing chamber is positioned at this location, below the other apparatus. The mixing chamber comprises a trough having a mixing auger therein which mixes and discharges the blended materials. The equipment is actuated by hydraulic motors powered by one or more electric, gasoline or diesel engines.

The present invention also provides an attachment by which wet clay soils are processed by breaking the wet clay clods into sizes which can pass through the vibratory screen, into the main bin.

An object of the invention is to screen materials introduced into the machine into a manageable consistency for the equipment to process.

A further object of the present invention is the ability to control pneumatic feed of dry powder materials directly from a bulk tank truck through valves and metering devices.

An important object of the present invention is that of accurate metering and total control of all introduced materials. The accuracy of the metering in the field should approximate, as closely as possible, laboratory conditions.

Another important object of the invention is that of complete and thorough mixing of the materials. The chemical stabilization of the contaminated soils, sludges and liquid/solid mixtures depends on the quality of the chemical mixing. This is accomplished by consistent metering and careful design and operation of the mixing chamber.

These and other objects and features of the present invention will become more fully apparent from the following description and claims taken in conjunction with the accompanying drawings.

DESCRIPTION OF TEE PRESENTLY PREFERRED EMBODIMENT

The present invention relates to on-site blending of soil and/or sludge with dry and/or liquid chemicals. This capability is particularly needed for the remediation of contaminated soils in the environmental field to reduce transportation of hazardous materials through populated areas for processing.

Figure 1:
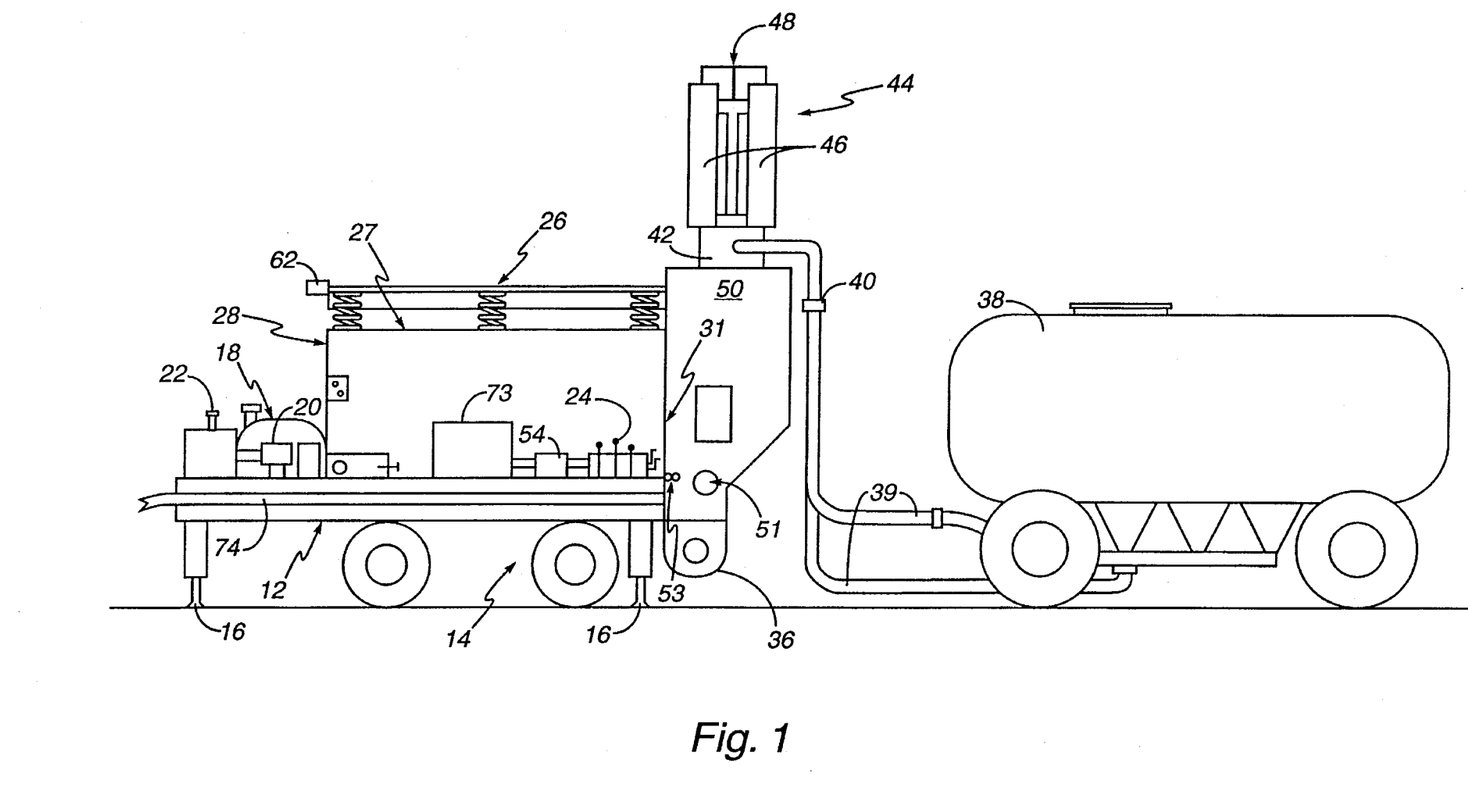
FIG. 1 is a side view of one presently preferred embodiment within the scope of the present invention as it would appear in operation.

Referring to FIG. 1, the apparatus 10 is supported on a structural framework 12 having a suspension 14 mounted thereon for transporting the apparatus 10 to a work site. Landing gear or extendable struts 16 are mounted on the framework 12 and provide stability. (The apparatus 10 can also be truck mounted.) The apparatus 10 is powered by motor means 18 which powers hydraulic pump means 20. Drawing from a hydraulic reservoir 22 of sufficient capacity, hydraulic fluid pressure is sent to control means 24 which regulates the various feed and mixing mechanisms. Soil or sludge (not illustrated) is loaded onto vibratory screen means 26 which separates material into the desired consistency for processing and directs the material into a main bin 28 through an open top 27 thereof. Conveying means 29 (FIGS. 2, 3), such as, drag chains means 30 (FIG. 2) conveys the material to first metering means 31 disposed at the rear of the main bin 28.

Figure 4A:
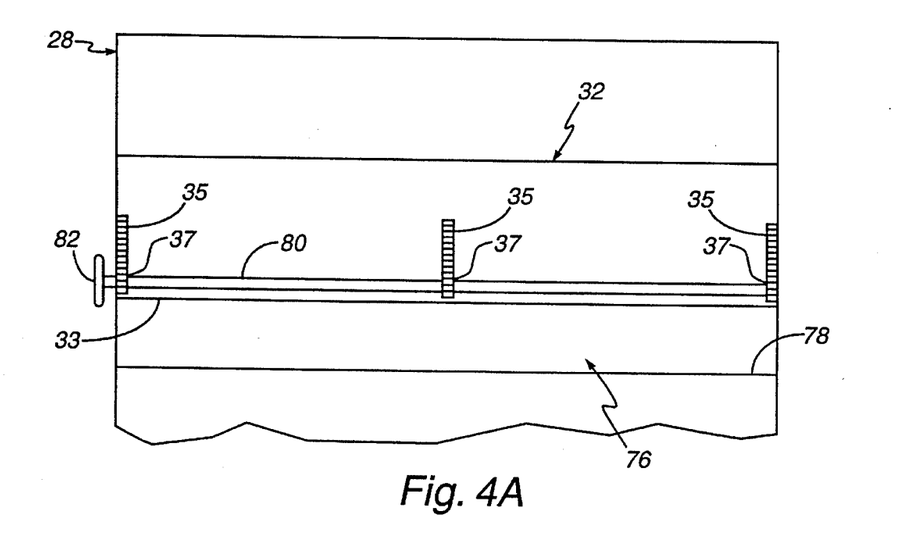
FIG. 4A is a rear view of the adjustable gate means.
Figure 4B:
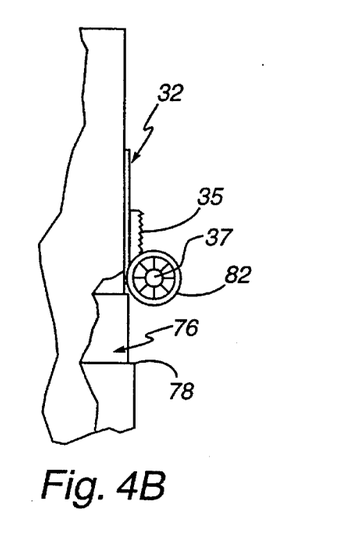
FIG. 4B is a side view of the adjustable gate means of FIG. 4A.

The first metering means 31 may take the form of an adjustable gate means 32 illustrated in FIGS. 4A and 4B. As can be seen, the adjustable gate means 32 has a bottom edge 33 which may be raised and lowered with respect to a lower edge 78 of the main bin means 28, to adjust the discharge opening 76 defined therebetween. The gate means 32 is operated, for example, by means of racks carried by the gate means 32 and pinions 37 engaged with the racks 35 and supported on a shaft 80 rotated by handle means 82. The gate means 32 can be used as a limiting mechanism to regulate the flow of material directly into mixing chamber means 36 thereby enabling further control of proportioning. Alternatively, the material flow can be regulated by speed of the hydraulic motors or gearing changes.

Figure 3:
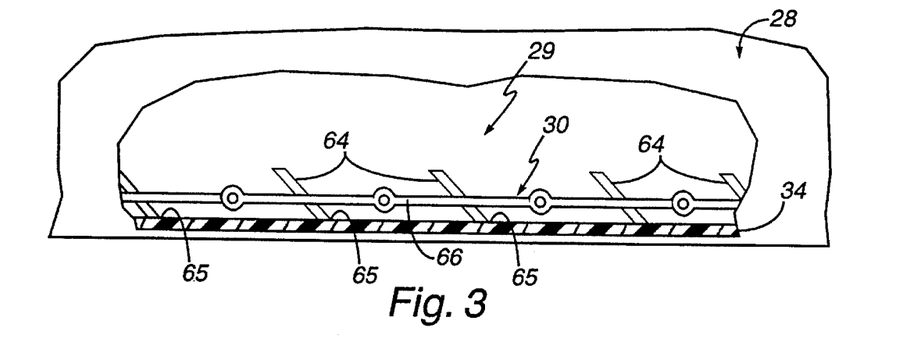
FIG. 3 is a fragmentary side view, partly in cross-section, illustrating the interior of the main bin.

As shown in FIG. 3, a sheet 34 of friction-reducing material, such as for example, polycarbonate, covers the floor of the main bin means 28 and aids in conveying the material to the adjustable gate means 32.

Figure 5A:
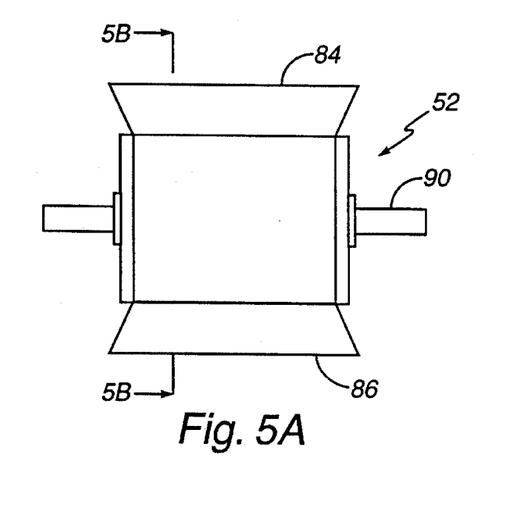
FIG. 5A is a side view of a rotary vane feeder used as dry feeder.
Figure 5B:
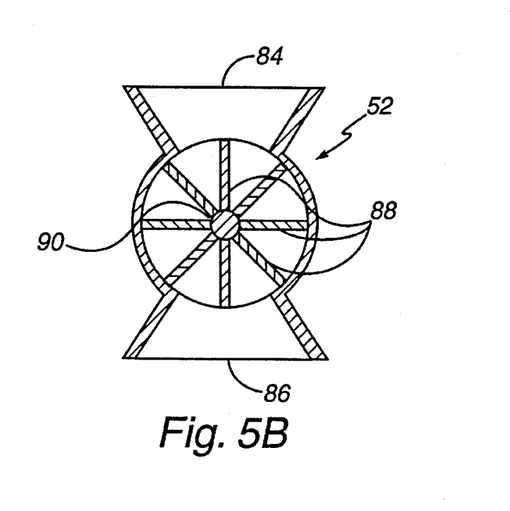
FIG. 5B is a cross-sectional view taken along the line 5B–5B of FIG. 5A.

The dry chemicals are fed pneumatically from a bulk tanker 38 through pipes 39 and intake valve means 40. The airborne chemicals are fed into modified cyclone means 42 which depletes the air pressure along with a bag filter system 44. The system 44 includes bag filter means 46 made of a fabric which has been singed on the inside for easy release of particulates. The bag filter means 46 are mounted on frame means 48 which enables shaking of the bags to release the powder. The cyclone means 42 discharges the dry chemicals into a dry chemical collector bin means 50. The collector bin means 50 must be of adequate size to allow sufficient accumulation of dry chemicals to match production needs. The second metering means 51 meters the dry chemicals into the mixing chamber means 36. The second metering means 51 may comprise such mechanisms as a solid-flight screw auger or a rotary vane feeder 52, such as illustrated in FIGS. 5A and 5B. As can be seen the rotary vane feeder 52 includes an inlet opening 84 and an outlet opening 86 and a series of vanes 88 projecting radially from a driven central shaft 90.

Figure 6:
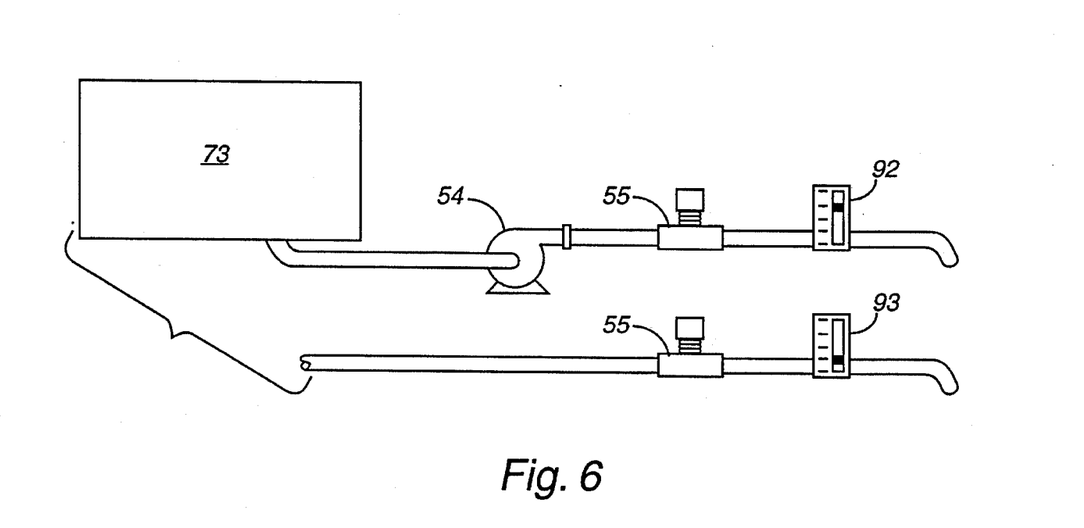
FIG. 6 is a perspective view of the wet chemical metering means.

Third metering means 53 are provided for metering the wet chemicals from a wet chemicals tank 73 (FIGS. 1 and 6) through pipe arrangement 55 into the mixing chamber means 36 or water from a water line 74 (FIGS. 1 and 6) into the mixing chamber means 36 . As best shown in FIG. 6, the third metering means 53 may include, for example, gauges, such as, wet chemical and water gauges 92, 93, respectively, for monitoring the wet chemicals and water; unit-mounted pump means 54 or external pump means (not illustrated) for moving the wet chemicals, and a flow control means 55 for controlling the flow of wet chemical and water whereby the wet chemicals and water are fed directly into the mixing chamber means 36. Any amount and number of wet chemicals can be added depending on mix designs and desired consistency of the blended output.

Figure 2:
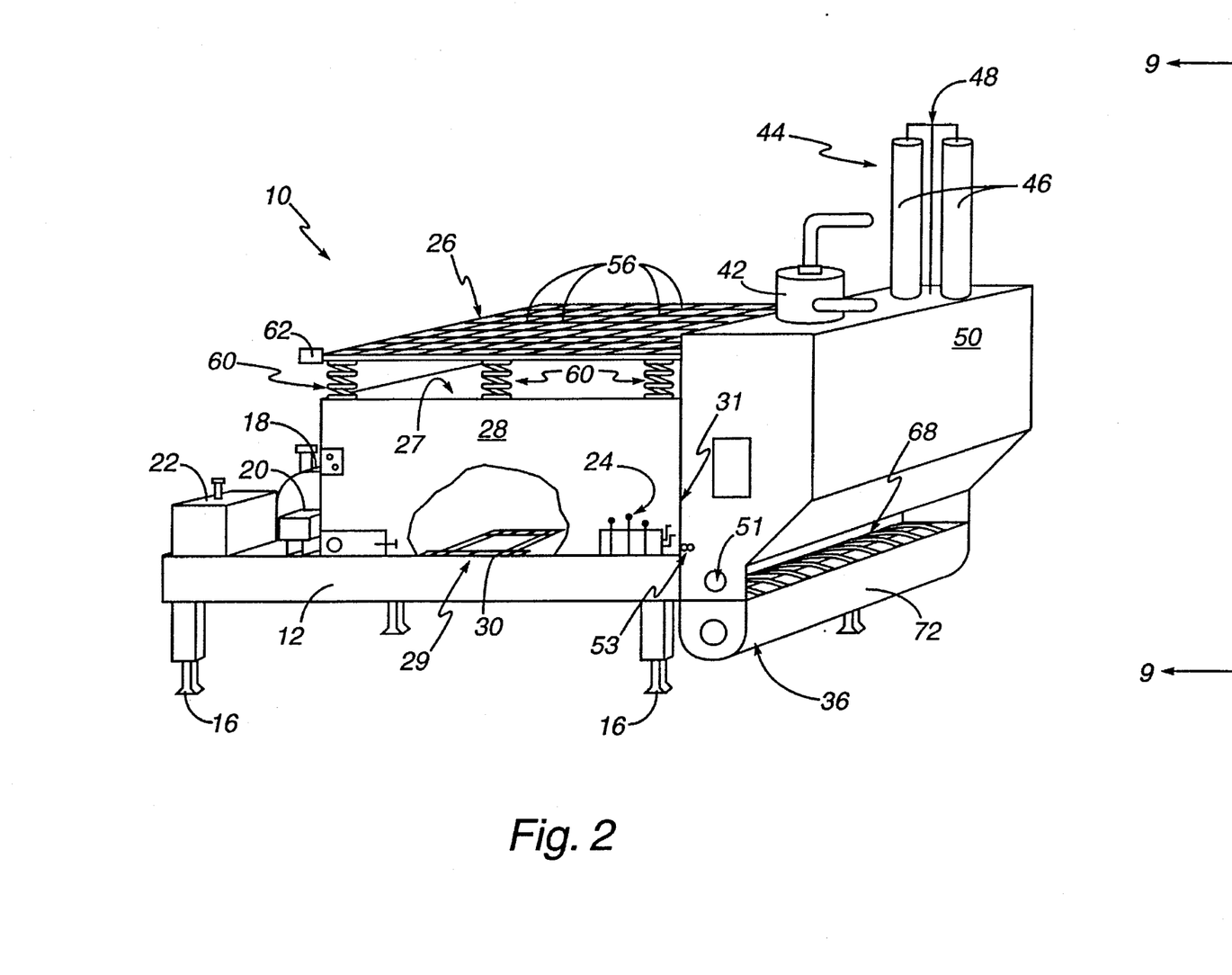
FIG. 2 is a perspective view, with parts cut away to show detail, of another embodiment within the scope of the present invention in the process of blending materials.

Referring to FIG. 2, several innovative mechanisms were developed on the present invention through prototype experimentation. The vibratory screen means 26 comprises interlocking bars 56 within a framework 58 which is mounted on spring means 60. Attached to the framework 58 is hydraulic motor means 62 which turns an eccentric counterweighted shaft (not shown) connected to the framework 58. The hydraulic motor means 62 is powered by the main engine 18 and causes vibrations of the screen means 26 which aids in sifting the material.

The drag chains means 30 need to be of sufficient strength to handle the stones and irregularities of material not ordinarily found in other conveyed materials. As shown in FIG. 3, the present invention uses flat bars 64 preferably welded at a 30 degree angle between two conveyor chains 66 (only one visible in FIG. 3) so that leading edge 65 is lower and does not encounter direct resistance from materials going through the narrowed confines of the adjustable metering gate 32.

Figure 7:
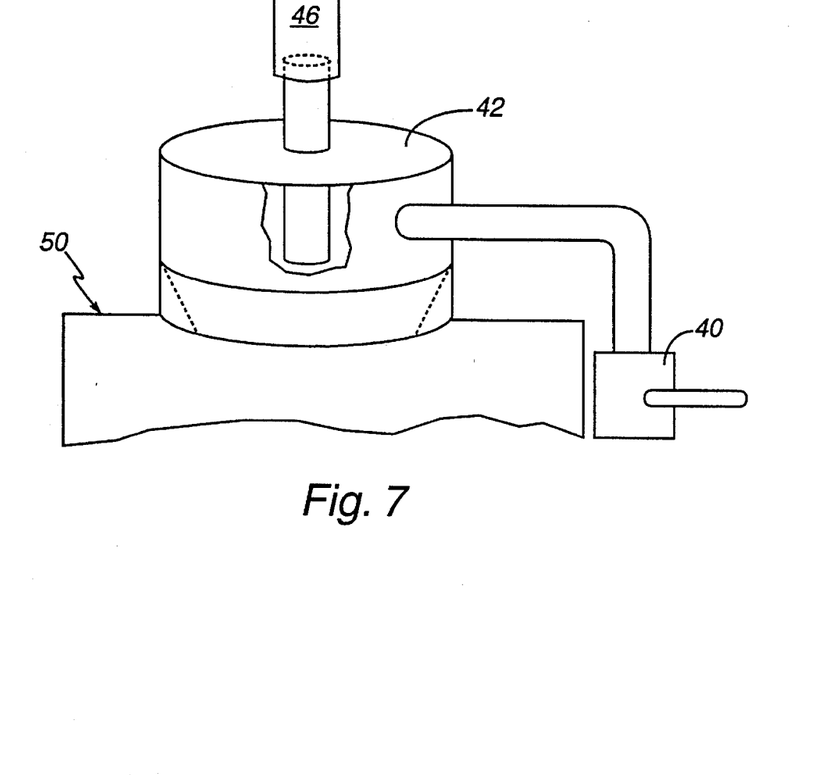
FIG. 7 is a perspective view, with parts cut away to show details, of the modified cyclone means.

Referring to FIG. 7, the cyclone means 42 at the dry chemical intake has been modified to be shorter and of greater diameter than normally specified due to the low air pressure and greater particulate volume of these pneumatically conveyed materials. The cyclone means 42 used in this instance is twice the diameter and the cone is one-fourth the height as normally specified.

Figure 8:
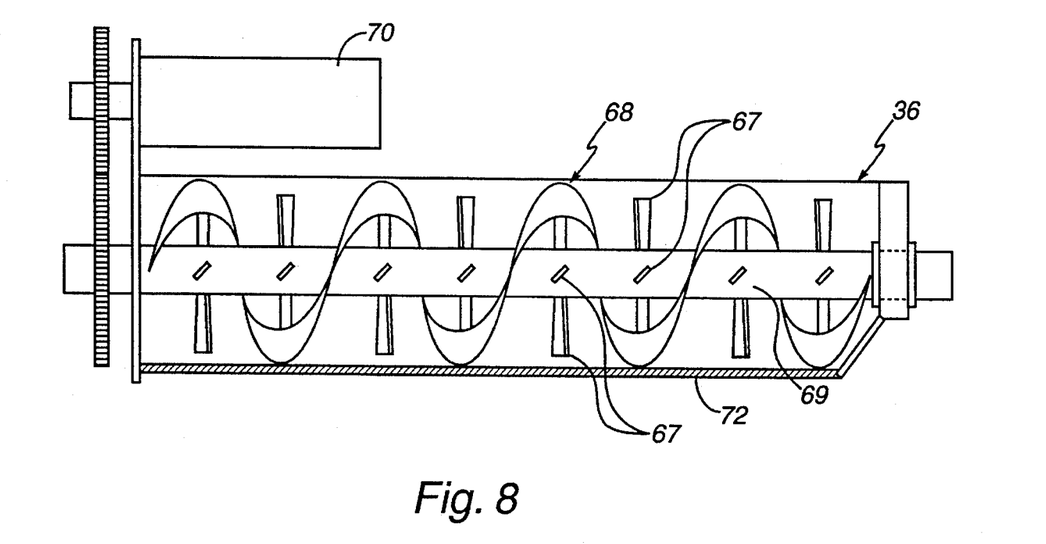
FIG. 8 is a cross-sectional view, with parts cut away to show detail, of a ribbon flight conveyor system.

Referring to FIG. 8, the mixing chamber means 36 in the present embodiment utilizes ribbon-flighted screw conveyor means 68 mounted on an auger shaft 69 which is driven by a hydraulic motor means 70. The motor means 70 is reversible so that in the event of a jam, the screw conveyor means 28 may be reversed to eliminate the jam. The conveyor means 68 is mounted inside a tight-fitting U-shaped metal trough 72 having a materials discharge opening 71 at one end thereof. The ribbon-flighting of the screw conveyor means 68 performs better mixing than a solid-flight screw conveyor. Mixing paddles 67 can be mounted to the auger shaft 69 for more complete mixing and still have a mix duration time of less than one minute, allowing maximum production capacities.

Figure 9:
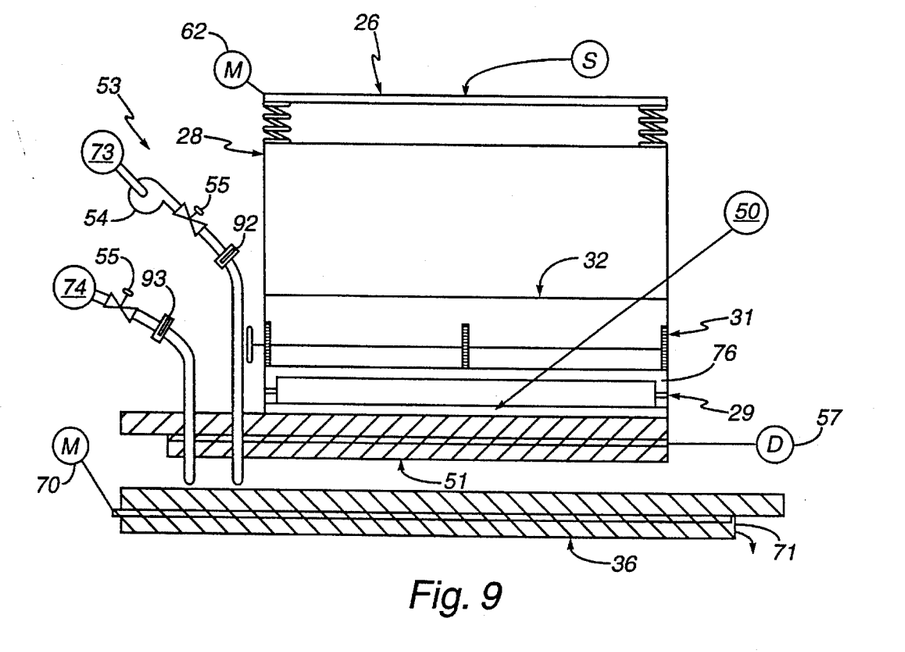
FIG. 9 is a schematic end view of the apparatus for FIG. 2, as viewed from the line 9—9 of FIG. 2.
Figure 10:
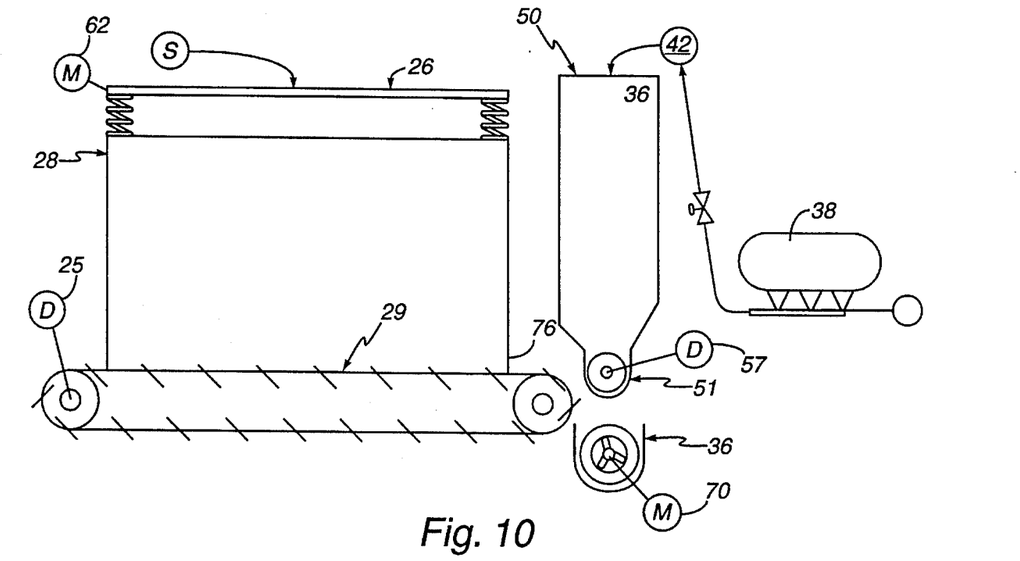
FIG. 10 is a schematic side view of the apparatus of FIG. 1.

Referring to FIGS. 9 and 10, there is illustrated a side view and an end view of the apparatus of FIGS. 1 and 2. As can be seen, a source S supplies material, such as soils, sludges and solid/liquid mixtures to the vibrating screen means 26. The screen means processes the material by screening out rocks and debris, and allows the processed material to drop into the main bin means 28. The material is then moved by the conveyor means 29 to the discharge opening 76 of the bin means 28, from where the material fall into the mixing chamber means 36. Depending on the material being stabilized, dry and/or wet chemicals and water are introduced into the mixing chamber means 36. That is, dry chemicals from the bulk tank 38 are pneumatically transferred to the modified cyclone 42, into the collector bin means 50 from where the dry chemicals are fed into the second metering means 51 which, in turn, feeds into the mixing chamber means 36. Wet chemicals from the wet chemical tank 73 and/or water from the source 74 are introduced into the mixing chamber 36. In the chamber 36, the materials are thoroughly mixed in a short period of time and then discharged through the material discharge opening 71.

Figure 11:
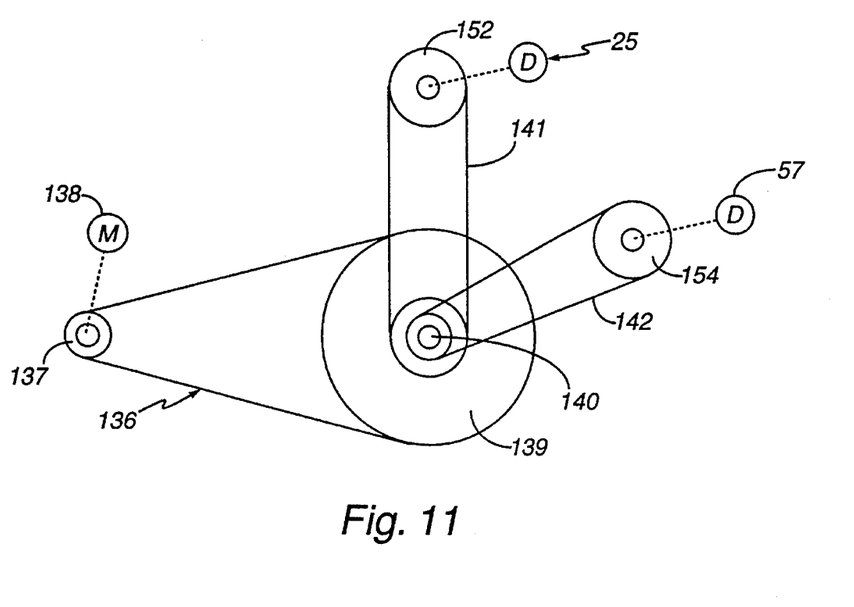
FIG. 11 is a schematic end view of mechanical gearing for driving the drag chain conveyor means and the dry chemical metering device.

The method of mechanical gearing 135 in the preferred embodiment of the present invention is illustrated in FIG. 11 and is by chain drive means 136 from the drive sprocket 137 of the primary hydraulic motor means 138 to a jackshaft sprocket 139 of a jackshaft 140 and from the jackshaft sprocket 139 by chain drive means 141 and 142 to drive sprocket 152 of the drive means 25 for the drag chains conveyor means 29 and to the drive sprocket 154 of the drive means 57 of the dry chemical metering device 51. This ensures that the mix design will remain stable during power fluctuations which is a critical factor in the chemical stabilization of soils. This setup also allows mix designs to be varied simply by changing gearing. The jackshaft 140 allows for the increased torque needed in these unusual material handling requirements. The mixing auger shaft 69 is driven by a separate hydraulic system to enable cleaning and rinsing without introducing other materials into it.

The present invention also provides an attachment 94 (FIGS. 12 to 15) by which wet clay soils (not illustrated) are processed by breaking the wet clay clods into sizes which can pass through the interlocking bars 56 of the vibratory screen means 26, into the main bin means 28. Referring to FIGS. 12 to 15, the attachment 94 comprises a C-shaped frame 96 having a back wall 98 and opposite side walls 100, 102. The back and side walls 98, 100 and 102 terminate at their upper ends in wall extensions 98a, 100a and 102a. The wall extensions 98a, 100a, 102a are inclined such that they direct the wet clay (not shown) into the interior of the attachment 94. An upstanding wall segment 104 extends between the forward end of the wall extensions 100a, 102a and adds rigidity to the C-shaped frame 96. The attachment 94 presents an open end 106 directly beneath the upstanding wall segment 104, through which rocks and debris are discharged away from the attachment 94. A series of spaced-apart, generally parallel bars 108 extend between and are secured to the upper ends of the back wall extension 98a and the wall segment 104. The bars 108 serve as a prescreen device which precludes entry of oversize rocks and debris from passing through the attachment 94. The attachment 94 may, as shown in FIG. 16, be mounted on the vibratory screen means 28 by means, for example, plural tabs 148 and fasteners 150. In this arrangement, the vibrating means 91 of the attachment 94, also serves to vibrate the screen means 28 and replaces the hydraulic motor means 62 shown in FIGS. 1 and 2.

Figure 12:
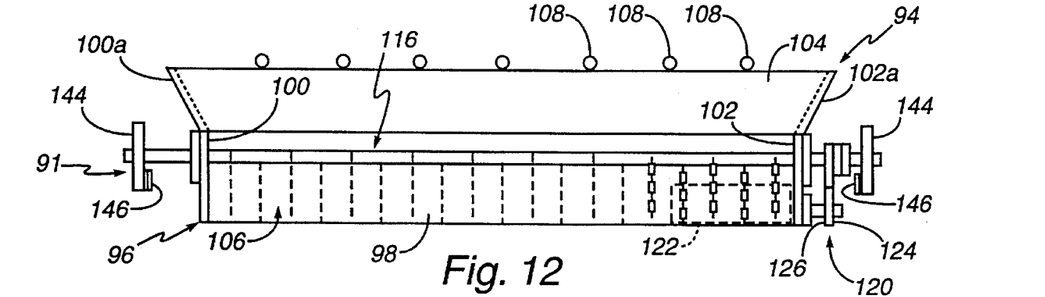
FIG. 12 is a front view of an attachment for preprocessing wet clay soils.
Figure 13:
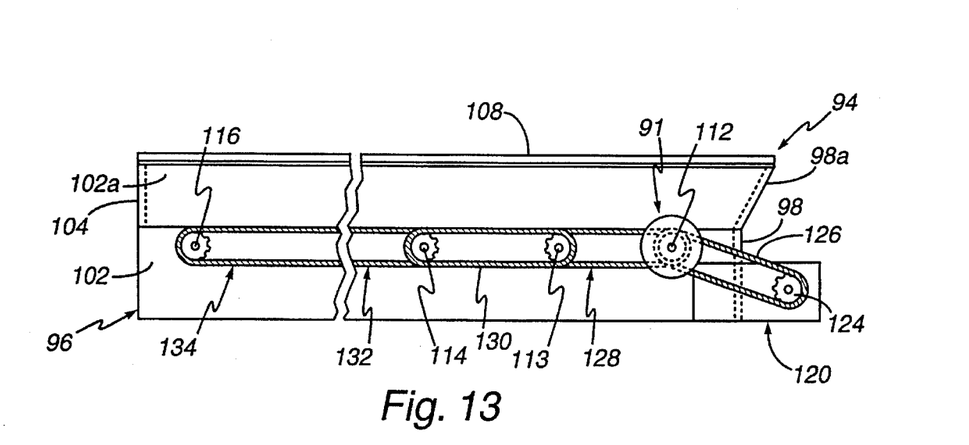
FIG. 13 is a plan view of the attachment of FIG. 12 with a portion broken away to show details.

The attachment 94 also incorporates a set 110 of spaced-apart, generally parallel shafts 112, 113, 114, 115 and 116 extending between the side walls 100, 102 and supported on bearing blocks 118 (FIG. 14) carried by the side walls 100, 102. Drive means 120 includes motor means 122 shown FIGS. 12 and 14, having a drive sprocket 124 for driving drive chain 126. As best shown in FIGS. 13 and 13, the drive means 120 also includes chain and sprocket drive means 128,130,132 and 134 carried at the free end of the shaft 112, sprockets 132,136 carried at the free ends of and drivingly connecting the shaft 113–116.

Figure 14:
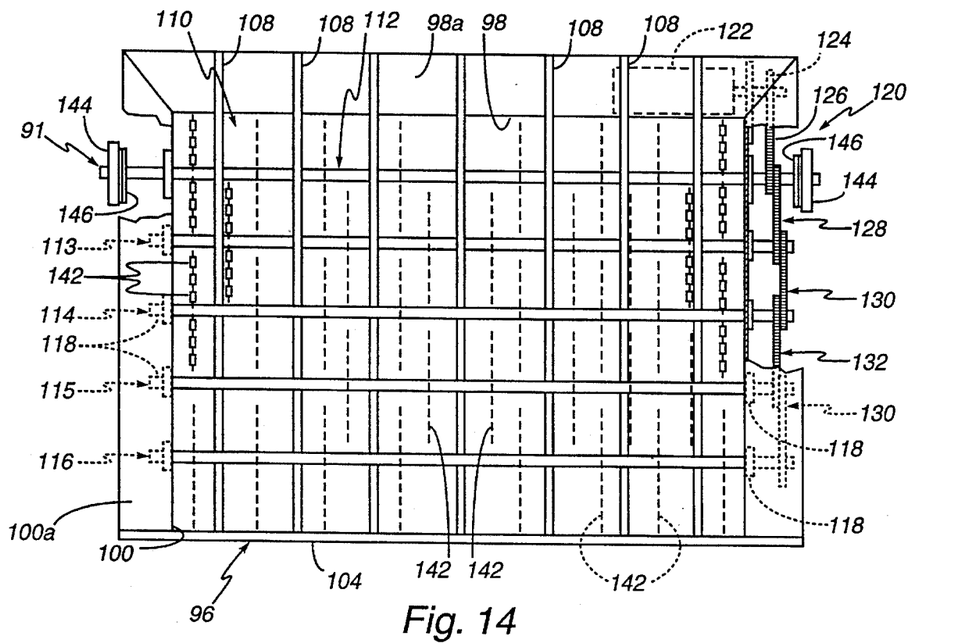
FIG. 14 is a side view of the attachment of FIG. 12.

The attachment 94 also is provided with vibrating means 91 for vibrating the container 95 and thereby discharging the processed wet clay soil from the apparatus 94. As best illustrated in FIGS. 13 and 14, the vibrating means 91 may comprise, for example, a disc 144 at each end of the shaft 112 and a weight carried by the disc 144 and which is offset from the rotational axis of the shaft 112. The arrangement provides an eccentric drive. During high speed rotation of the shaft 112, the attachment 94 is vibrated to such an extent that the processed wet clay soils therein are discharged into the main bin means 28. Any other suitable vibrating means 91 may be provided.

Figure 15:
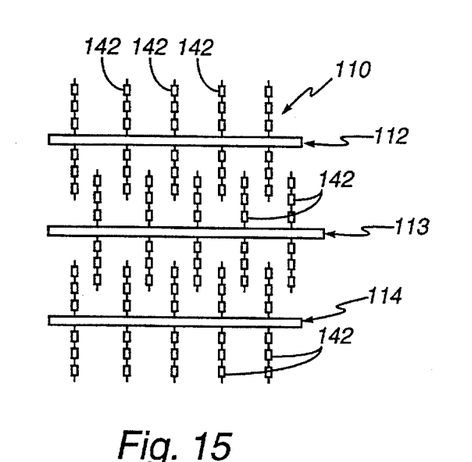
FIG. 15 a is fragmentary plane view of parallel shafts employed in the attachment of FIGS. 12–14, having chains which are rotated to provide a hammer mill effect for breaking up wet clay clods.
Figure 16:
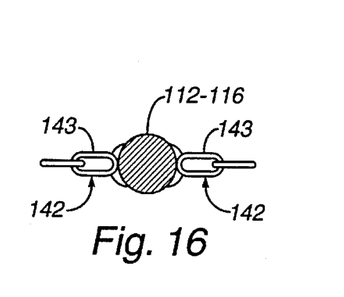
FIG. 16 is a fragmentary cross-sectional view of a shaft illustrating the connection of the flail chains thereto.
Figure 17:
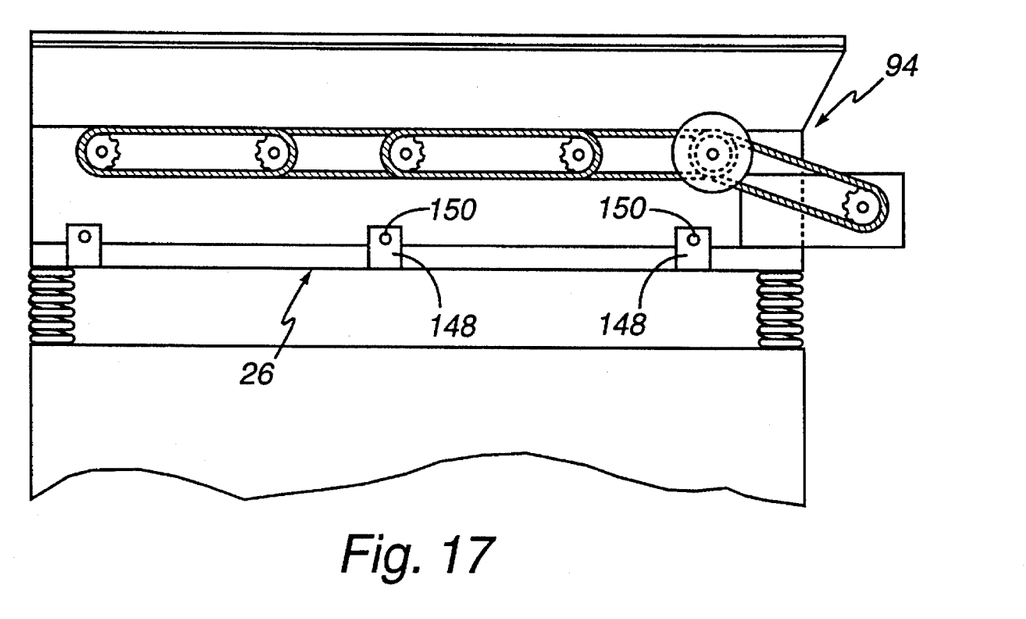
FIG. 17 is a side view, similar to FIG. 13, illustrating the attachment mounted on the vibratory screen means.

As best shown in FIG. 14 and partly shown in FIG. 15, each of the shafts 112–116 is provided with flail chains 142 which preferably are uniformly spaced along the length of the shaft 112–116. In the preferred arrangement, the flail chains 142 of the shafts 113 and 115 are staggered relative to the flail chains 142 of the shafts 112,114 and 116. For the purpose of illustration, the flail chains 142 are shown extending outwardly from the shafts 112–116 such as they would be if the shafts 112–116 were being driven at high speed. The flail chains 142 normally drape downwardly from the shafts 112–116, as shown in FIG. 12, when the shafts 112–116 are stationary. As illustrated in FIG. 16, links 143 of two flail chains 142, are secured as by welding, to opposite sides of each of the shafts 112–116. Alternatively, more than two flail chains 142 could be secured to the periphery of the shafts 112–116.

As wet clay soil is introduced into the attachment 94, the high speed driven flail chains 142 break up the clay clods to a size such that they can pass through the interlocking bars 56 of the vibratory screen means 28.

From the foregoing it will be appreciated that the present invention provides a single apparatus which is capable of a variety of blending capabilities with a variety of materials commonly required in the environmental field.

The invention may be embodied in other specific from without departing form its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed

1. Apparatus for stabilizing contaminated soils, sludges and liquid/solid mixtures comprising:

main bin means receiving contaminated soils, sludges and liquid/solid mixtures and having a discharge end;

conveying means within said main bin means moving said contaminated soils, sludges and liquid/solid mixtures to said discharge end;

a source of dry powdered chemicals;

a source of wet chemicals;

collector bin means adjacent to and communicating with said main bin means, receiving dry powdered chemicals from said source of dry powdered chemicals, and wet chemicals from said source of wet chemicals;

mixing chamber means adjacent to said discharge end of said main bin means and to said collector bin means;

first metering means at the discharge end of said main bin means metering said contaminated soils, sludges and liquid/solid mixtures to said mixing chamber means;

second metering means metering said dry chemicals to said mixing chamber means;

third metering means metering said wet chemicals to said mixing chamber means;

screen means sizing said contaminated soils, soils and solid/liquid mixtures for delivery to said main bin means; and an attachment connected to said screen means for delivering processed wet clay soil to said screen means, said attachment comprising:

a container having opposite side walls, a back wall, and an open front;

generally parallel, spaced-apart shafts extending through said container and being rotatably supported on said opposite sides;

drive means for rotating said shafts;

means associated with said shafts for breaking up clumps of wet soil; and means for vibrating said container and thereby discharging said processed wet clay soil from said container.

2. The apparatus as defined in claim 1 wherein said second metering means is disposed within said main bin means.

3. The apparatus as defined in claim 1 wherein said third metering means is disposed within said main bin means.

4. The apparatus as defined in claim 3 including vibratory screen means sizing said contaminated soils, sludges and liquid/solid mixtures for delivery to said main bin means.

5. The apparatus as defined in claim 4 wherein said main bin means has an open top; and said vibratory screen means is carried by said main bin means at said open top.

6. The apparatus as defined in claim 4 including spring means supporting said vibratory screen means above said open top; and motor means for vibrating said vibratory screen means to aid in sifting said material.

7. The apparatus as defined in claim 1 wherein said means for breaking up clumps comprises flail chains secured to said shafts.

8. The apparatus as defined in claim 1 wherein said means for vibrating comprises:

an eccentric weight associated with each end of at least one of said shafts.

9. The apparatus as defined in claim 1 including pneumatic conveying means conveying said dry powdered chemicals from said source of dry powdered chemicals; and cyclone separator means receiving said dry powdered chemicals from said source for discharge into said collector bin means.

10. The apparatus as defined in claim 9 including bag filter means associated with said collector bin means capturing dry powdered chemical particle entrained by said pneumatic conveying means.

* * * * *